(12) United States Patent
Schröder

(10) Patent No.: US 9,726,117 B2
(45) Date of Patent: Aug. 8, 2017

(54) MIXING VALVE

(71) Applicant: Lothar Schröder, Karben (DE)

(72) Inventor: Lothar Schröder, Karben (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/370,159

(22) PCT Filed: Dec. 20, 2012

(86) PCT No.: PCT/EP2012/076525
§ 371 (c)(1),
(2) Date: Jul. 1, 2014

(87) PCT Pub. No.: WO2013/102582
PCT Pub. Date: Jul. 11, 2013

(65) Prior Publication Data
US 2014/0338769 A1   Nov. 20, 2014

(30) Foreign Application Priority Data

Jan. 6, 2012   (DE) .................. 10 2012 200 170

(51) Int. Cl.
*F16K 11/22* (2006.01)
*F02M 25/07* (2006.01)
(Continued)

(52) U.S. Cl.
CPC ........ *F02M 25/0722* (2013.01); *F02M 26/19* (2016.02); *F16K 11/10* (2013.01); *F16K 11/20* (2013.01); *Y10T 137/8766* (2015.04)

(58) Field of Classification Search
CPC .... F16K 11/10; F16K 11/20; Y10T 137/8766; Y02T 10/121; F02M 25/0722; F02M 26/19
(Continued)

(56) References Cited

U.S. PATENT DOCUMENTS 1,312,147 A * 8/1919 Wallwin ............... B05B 7/0475
                                                  239/427
1,816,528 A * 7/1931 Haysel .................. B01F 5/0077
                                                  261/79.1
(Continued)

FOREIGN PATENT DOCUMENTS

DE          539423        11/1931
DE         10019414       10/2001
(Continued)

OTHER PUBLICATIONS

Office Action dated Nov. 23, 2015 which issued in the corresponding Chinese Patent Application No. 201280063602.0.

*Primary Examiner* — Umashankar Venkatesan
(74) *Attorney, Agent, or Firm* — Cozen O'Connor

(57) ABSTRACT

A mixing valve includes a housing having, arranged therein: a first flow duct having a first flap mounted rotatably in the first flow duct and configured to influence the throughflow cross section of the first flow duct, and a second flow duct, the second flow duct issuing into the first flow duct, and having a second flap mounted rotatably in the second flow duct and configured to influence the throughflow cross section of the second flow duct. The first flow duct has, downstream of the issue of the second flow duct, as seen in the flow direction, a region with at least two cross-sectional widenings, and at least one stationary guide element, projecting into the first flow duct, is arranged in the region with the at least two cross-sectional widenings.

11 Claims, 3 Drawing Sheets

(51) Int. Cl.
*F16K 11/20* (2006.01)
*F16K 11/10* (2006.01)
*F02M 26/19* (2016.01)

(58) Field of Classification Search
USPC .................................. 137/897, 896, 605, 606
See application file for complete search history.

(56) References Cited

U.S. PATENT DOCUMENTS

| | | | |
|---|---|---|---|
| 2,511,291 A * | 6/1950 | Mueller | B01F 5/0603 137/897 |
| 4,299,655 A * | 11/1981 | Skaugen | B01F 5/0413 162/343 |
| 4,929,088 A | 5/1990 | Smith | |
| 7,552,722 B1 | 6/2009 | Shieh et al. | |
| 2006/0180224 A1 | 8/2006 | Berggren et al. | |
| 2006/0180244 A1 | 8/2006 | Ayala et al. | |
| 2007/0177452 A1 | 8/2007 | Aroussi | |

FOREIGN PATENT DOCUMENTS

| | | |
|---|---|---|
| JP | 63-89204 | 4/1988 |
| JP | 2000-008967 | 1/2000 |
| JP | 2009-156265 | 7/2009 |
| WO | WO 2011/102959 A2 | 8/2011 |

\* cited by examiner

MIXING VALVE

CROSS-REFERENCE TO RELATED APPLICATIONS

This is a U.S. national stage of application No. PCT/EP2012/076525, filed on 20 Dec. 2012, which claims priority to the German Application No. 10 2012 200 170.0, filed 6 Jan. 2012, the content of both incorporated herein by reference.

BACKGROUND OF THE INVENTION

1. Field of the Invention

The invention is related to a mixing valve with a housing, in which a first flow duct and a second flow duct are arranged, the second flow duct issuing into the first flow duct, and in each case with a flap mounted rotatably in the respective flow duct in order to influence the throughflow cross section.

2. Related Art

Mixing valves of this type serve for mixing two gases or two liquids and are used, for example, as exhaust gas mixing valves in motor vehicles. For this purpose, it is known to enable the second flow duct to issue into the first flow duct at an angle of 90° or less. Insofar as one stream is dominant, this is mostly routed in the first flow duct, and the second stream is delivered via the issuing second flow duct. In this case, it has been shown that the full mixing of the two streams until they leave the housing is often incomplete, or that a longer flow distance is required for this. This is true especially when the dominant stream flows at high velocity. This disadvantage can be mitigated by turbulence elements. This, however, increases the flow resistance.

SUMMARY OF THE INVENTION

An object of the invention is, therefore, to provide a mixing valve that allows good full mixing of two fluids in as small a construction space as possible, without the flow resistance being increased.

According an aspect of the invention, this object is achieved in that the first flow duct has, downstream of the issue of the second flow duct, as seen in the flow direction, a region with at least two cross-sectional widenings, and in that at least one stationary guide element projecting into the flow duct is arranged in this region.

It has been shown that guide elements projecting into the flow duct bring about an improved intermixing of the fluids. The simultaneous cross-sectional widening of the flow duct in this case prevents the flow resistance from being increased as a result of the arrangement of the guide elements. Moreover, the cross-sectional widening has an additional mixing effect upon the two fluids because it influences the flow direction.

An especially high additional mixing effect is achieved in that the cross-sectional widenings are arranged symmetrically over the circumference of the flow duct. Particularly in the case of two cross-sectional widenings, these are arranged opposite to one another. In another refinement, this applies equally to the guide elements, which are likewise arranged symmetrically over the circumference of the flow duct, and at the same time advantageously lie in each case opposite one another.

The highest possible intermixing, with additional flow resistances at the same time being avoided, is achieved by a refinement in which the guide elements are arranged so as to be offset to the cross-sectional widenings with respect to the circumference of the flow duct.

The guide elements may be arranged perpendicularly to the main flow direction, while, to avoid too high flow resistances, having only a small radial extent. By contrast, an enhancement of the full mixing of the fluids, without an increase in flow resistance, is achieved by a refinement in which the guide elements are arranged at an angle deviating from the perpendicular to the main flow direction, preferably of between 30° and 60°. Due to the angled arrangement, the projected extent of the guide plates perpendicular to the main flow direction is smaller than their actual length. However, the guide plates thereby also possess a projected extent in the flow direction, so that they are in contact with the fluids for a longer period of time and can influence the flow profile of these. The guide elements may in this case be arranged both so as to point in the flow direction and so as to point opposite to the flow direction.

The ability to produce the housing is simplified if the housing is composed of two parts and the parting plane of the two parts lies in the region of the cross-sectional widening. This enables the housing to be produced from metal by casting or from plastic by injection molding. It is also conceivable, however, in the case of a plastic housing, to generate the cross-sectional widenings by a gas internal pressure method, so that the housing can be made in one part.

In a simple refinement, the connection of the two parts of the housing takes place via a flange connection, in that the two parts have at their parting plane a flange integrally formed onto the respective housing part.

Separate mounting of the at least one guide element may be dispensed with if the guide element is formed in one part with a housing part.

By contrast, the ability to produce the guide elements and the at least one housing part is simplified if the at least one guide element is arranged as a separate component in the region of the first flow duct. For this purpose, the at least one guide element possesses a ring-shaped carrier, which is introduced into the region having the cross-sectional widenings. This carrier can be secured both axially and radially, in that its axial length corresponds to the length of the region of the cross-sectional widenings, its circumference corresponds to the contour of the region of the cross-sectional widenings or the carrier is inserted into the region of the cross-sectional widenings by a press fit.

In another refinement, the ring-shaped carrier is configured as an intermediate flange inserted between the two flanges of the housing parts.

BRIEF DESCRIPTION OF THE DRAWINGS

The invention is explained in more detail by more than one exemplary embodiment. In the drawings.

DETAILED DESCRIPTION OF THE PRESENTLY PREFERRED EMBODIMENTS

Figure 1:
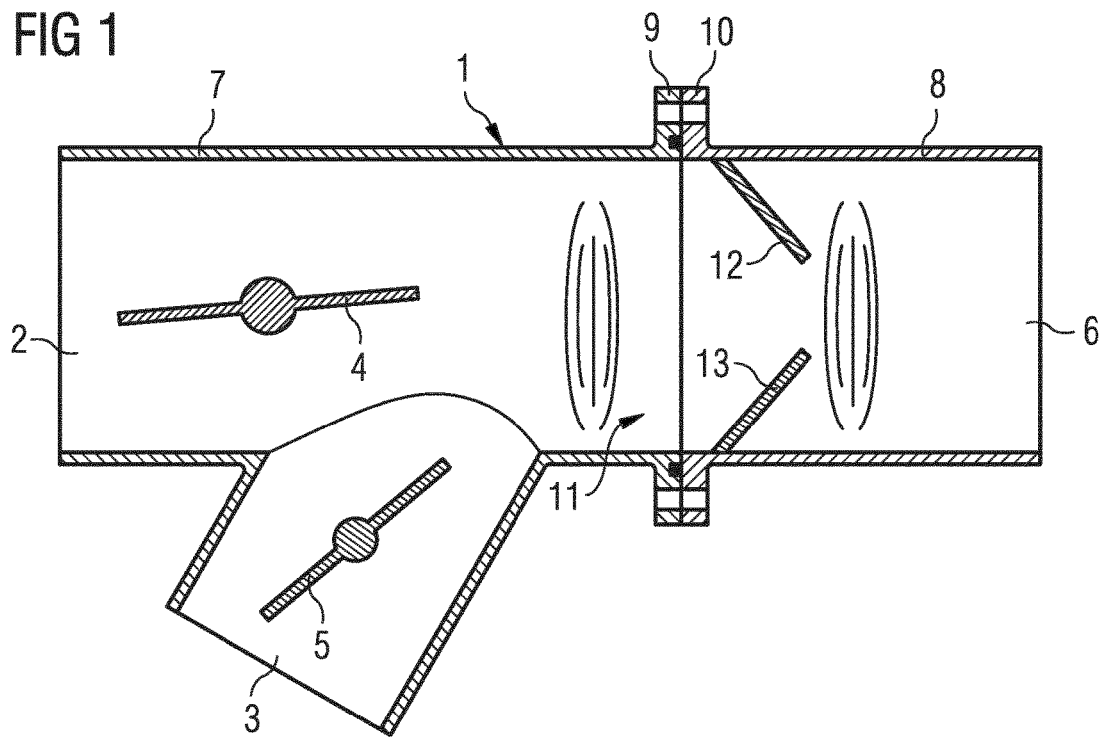
FIG. 1 shows a section through a mixing valve according to the invention.

The mixing valve in FIG. 1 is an exhaust gas mixing valve in a motor vehicle. It is composed of a housing 1, in which a first flow duct 2 and a second flow duct 3 are arranged, the second flow duct 3 issuing into the first flow duct 2, and in each case with a flap 4, 5 mounted rotatably in the respective flow duct in order to influence the throughflow cross section. The drive and control of the flaps 4, 5 to regulate the throughflow rate are not illustrated. Fresh air flows as the dominant gas in the first flow duct 2. Hot exhaust gas is delivered via the flow duct 3 in order to mix it with the fresh air before this mixture is delivered at the outlet 6 of the first flow duct 2 to a turbocharger, not illustrated. In this case, it is to have as good full mixing of the fresh air with the exhaust gas as possible, in order to prevent the turbocharger from being damaged by the hot exhaust gas as a result of insufficient intermixing. The housing 1 is composed of the housing parts 7, 8, which are connected to one another in each case by a flange 9, 10. Arranged at this parting plane of the housing 1 is a region 11 with cross-sectional widenings, which extends into both housing parts 7, 8 and the configuration of which is dealt with in the following figures. Two guide elements 12, 13 are arranged in the flow duct 2 of the housing part 8 at an angle deviating by 45° from the perpendicular to the main flow direction in the first flow duct 2. The two guide elements 12, 13 are produced in one part with the housing part 8 and are arranged opposite one another and therefore symmetrically on the circumference of the region 11.

Figure 2:
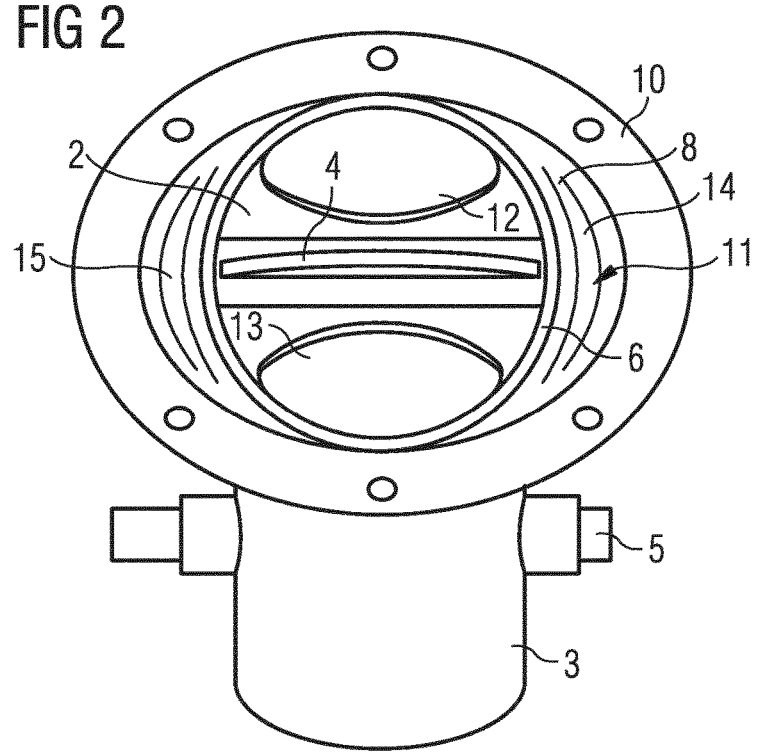
FIG. 2 shows a side view of FIG. 1.

FIG. 2 shows a side view of the mixing valve, looking into the outlet 6 of the mixing valve. Whereas the outlet 6 has a round cross section, the region 11 possesses two sickle-shaped cross-sectional widenings 14, 15, which are arranged opposite one another, so that the region 11 acquires overall an elliptical cross section. The cross-sectional widenings 14, 15 are arranged so as to be offset at 90° to the guide elements 12, 13 on the circumference of the region 11. The cross-sectional widenings provide additional space for the flowing gases, in order thereby to compensate the flow resistance of the guide elements arranged in the region 11. However, this deflection influences the flow profile, thus, in turn, increasing the full mixing. The guide elements 12, 13 possess an elliptical configuration. It is also conceivable, however, for the guide elements to have a circular or polygonal configuration.

Figure 3:
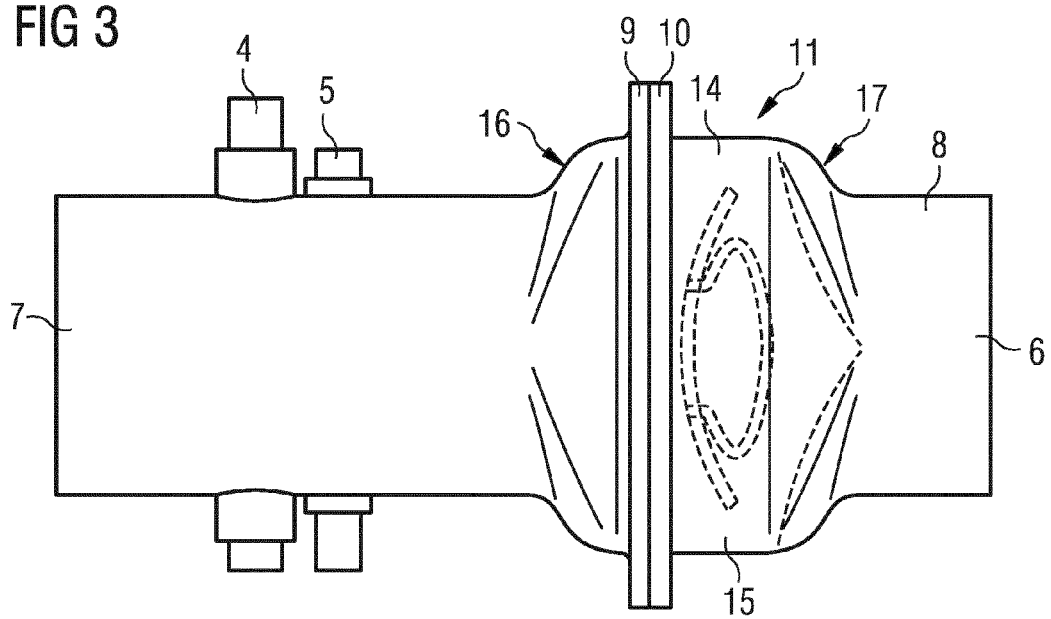
FIG. 3 shows a top view of FIG. 1.

FIG. 3 illustrates the mixing valve in a view from above, in which the region 11 with the cross-sectional widenings 12, 13 can be seen clearly because of the arrangement offset at 90° to the guide elements. In order to avoid too great an influence upon the flowing gases, the transitions 16, 17 of the first flow duct 2 to the region 11 are rounded, which means that they run continuously and therefore without steps.

Figure 4:
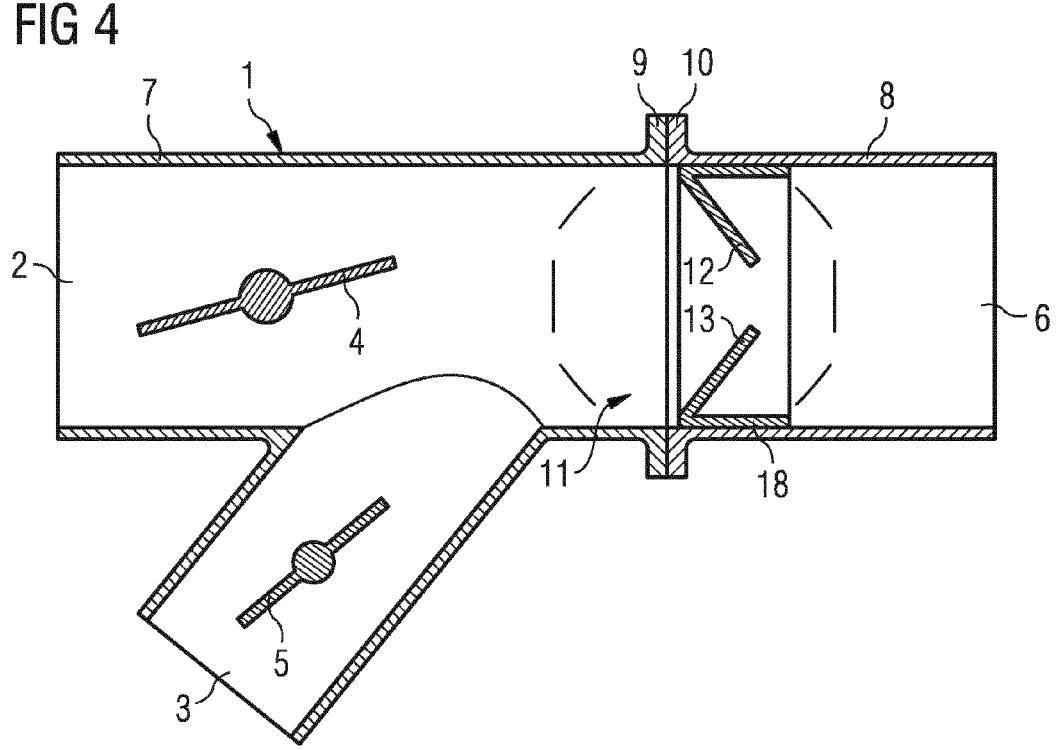
FIGS. 4 and 5 show two diagrammatic embodiments of the arrangement of the guide elements.

FIG. 4 shows the region 11 in which the guide elements 12, 13 are arranged. The guide elements 12, 13 are introduced as a separate component in the region 11, the guide elements 12, 13 being connected in one part to a ring-shaped carrier 18. The outside diameter of the carrier 18 is larger than the inside diameter of the first flow duct 2, so that the carrier 18 is fixed axially and radially in the first flow duct 2 in the region of the guide elements 12, 13 by a press fit.

Figure 5:
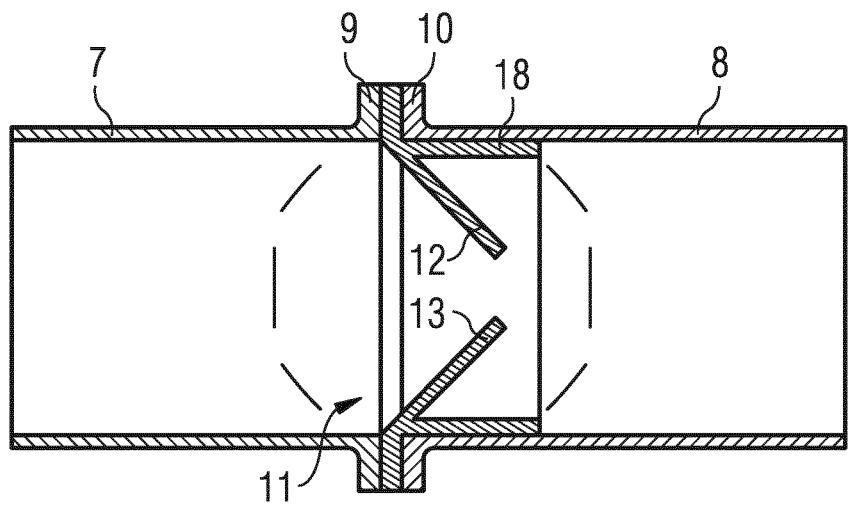

According to FIG. 5, the carrier 18 having the guide elements 12, is not fixed in the flow duct, but instead at the parting plane of the housing 1, in that the carrier is designed as an intermediate flange and is arranged between the flanges 9, 10.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mixing valve comprising:
a housing having, arranged therein;
a first flow duct (2) having a first flap mounted rotatably in the first flow duct (2) and configured to influence the throughflow cross section of the first flow duct (2); and
a second flow duct (3), the second flow duct (3) issuing into the first flow duct (2), and having a second flap mounted rotatably in the second flow duct (3) and configured to influence the throughflow cross section of the second flow duct (3),
wherein the first flow duct (2) has, downstream of the issue of the second flow duct (3), as seen in the flow direction;
a region (11) with at least two cross-sectional widenings (14, 15), and
a first stationary guide element (12) and a second stationary guide element (13) arranged in the region (11) with the at least two cross-sectional widenings (14, 15), each of the first and second stationary guide elements (12, 13) projecting into the first flow duct (2), each of the first and second stationary guide elements (12, 13) being attached by a respective first end to the housing, and each of the first and second stationary guide elements (12, 13) extending from the housing into the first flow duct (2) in a downstream direction, each of the first and second stationary guide elements terminating, in the downstream direction, in a respective second end thereof, the second end of the first stationary guide element being spaced apart from the second end of the second stationary guide element in a direction perpendicular to the downstream direction so as to form a direct flow path between the respective second ends of the first and second stationary guide elements in the downstream direction, and
wherein the cross-sectional widenings (14, 15) are arranged opposite one another in the first flow duct (2) so that at least a portion of the region (11) has an elliptical cross-section.

2. The mixing valve as claimed in claim 1, wherein the cross-sectional widenings (14, 15) are arranged symmetrically over the circumference of the first flow duct (2).

3. The mixing valve as claimed in claim 2, wherein the first and second stationary guide elements (12, 13) are arranged symmetrically over the circumference of the first flow duct (2).

4. The mixing valve as claimed in claim 3, wherein the first and second stationary guide elements (12, 13) are arranged so as to be offset to the cross-sectional widenings (14, 15) with respect to the circumference of the first flow duct (2).

5. The mixing valve as claimed in claim 1, wherein at least one of the first and second stationary guide elements (12, 13) is arranged at an angle deviating from perpendicular to the flow direction.

6. The mixing valve as claimed in claim 1, wherein the housing (1) has a first part (7) and a second part (8) and a panting plane of the first and second parts, wherein the parting plane of the first and second parts lies in the region (11) with the at least two cross-sectional widenings (14, 15).

7. The mixing valve as claimed in claim 6, further comprising a flange connection (9, 10) configured to connect the first and second parts (7, 8) to one another.

8. The mixing valve as claimed in claim 6, wherein at least one of the first and second stationary guide elements (12, 13) is formed in one of the first part and the second part.

9. The mixing valve as claimed in claim 1, wherein at least one of the first and second stationary guide elements (12, 13) is arranged as a separate component (18) in the region (11) of the first flow duct (2).

10. The mixing valve a claimed in claim 9, wherein at least one of the first and second stationary guide elements (12, 13) is connected to a carrier inserted into the first flow duct (2).

11. The mixing valve as claimed in claim 5, wherein the angle deviating from perpendicular to the flow direction is between 30° and 60°.

* * * * *